United States Patent [19]

Kurokawa et al.

[11] 3,754,096

[45] Aug. 21, 1973

[54] COLOR TELEVISION SIGNAL REPRODUCING SYSTEM

[75] Inventors: Hiromichi Kurokawa, Atsugi-shi, Kanagawa; Yasuharu Kubota, Fujisawa-shi, Kanagawa, both of Japan

[73] Assignee: Sony Corporation, Tokyo, Japan

[22] Filed: Nov. 26, 1971

[21] Appl. No.: 202,469

[30] Foreign Application Priority Data

Nov. 27, 1970 Japan .............................. 45/105215

[52] U.S. Cl. .............................................. 178/5.4 ST

[51] Int. Cl. .............................................. H04n 9/06

[58] Field of Search ...................... 178/5.4 R, 5.4 ST

[56] References Cited

UNITED STATES PATENTS 2,769,855 11/1956 Boothroyd et al. ............ 178/5.4 ST 3,575,548 4/1971 Kurokawa ...................... 178/5.4 ST

*Primary Examiner*—Richard Murray

*Attorney*—Lewis H. Eslinger et al.

[57] ABSTRACT

A phase modulated color video signal, for example, from a color television camera, is directly converted into an NTSC signal, without demodulation of the color signal components, by amplitude modulating the phase modulated color video signal with a signal of a frequency twice as high as the carrier frequency of the phase modulated color video signal, and then deriving a vector converted color video signal from the result of such amplitude modulation.

4 Claims, 30 Drawing Figures

INVENTOR.
YASUHARU KUBOTA
BY HIROMICHI KUROKAWA

INVENTOR.
BY YASUHARU KUBOTA
HIROMICHI KUROKAWA

INVENTOR
YASUHARU KUBOTA
BY HIROMICHI KUROKAWA

INVENTOR.
YASUHARU KUB[redacted]
BY HIROMICHI KUROKAWA

INVENTOR.
YASUHARU KUBOTA
BY HIROMICHI KUROKAWA

Fig. 10A
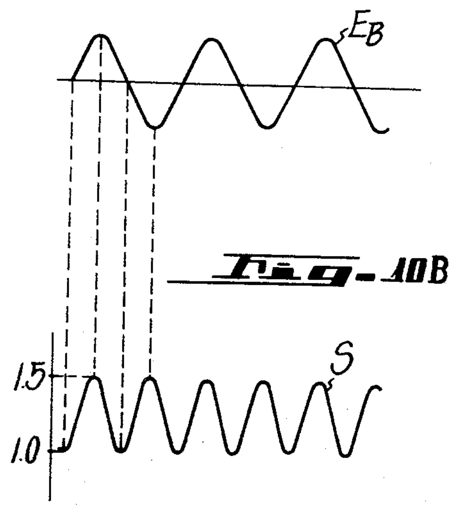
Fig. 10A, Fig. 10B
Fig. 11A
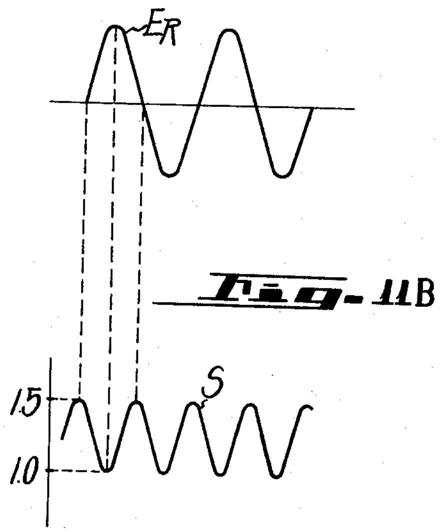
Fig. 11A, Fig. 11B
Fig. 10C
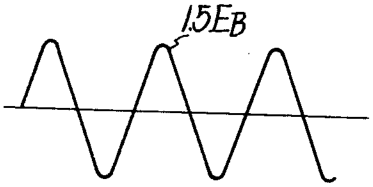
Fig. 11C
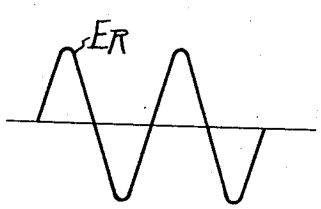
INVENTOR
YASUHARU KUBOTA
BY HIROMICHI KUROKAWA

INVENTOR.
YASUHARU KUBOTA
BY HIROMICHI KUROKAWA

INVENTOR.
YASUHARU KUBOTA
BY HIROMICHI KUROKAWA

INVENTOR.
YASUHARU KUBOTA
BY HIROMICHI KUROKAWA

INVENTOR.
YASUHARU KUBOTA
BY HIROMICHI KUROKAWA

COLOR TELEVISION SIGNAL REPRODUCING SYSTEM

This invention relates generally to a color television signal reproducing system, and more particularly to such a system which can provide an NTSC color signal.

Heretofore, a color television camera has been proposed which produces a color video signal by the use of one or two image pickup tubes. With this type of camera, a composite signal of at least two color components is derived from the image pickup tube or tubes and separated into color signals and then converted into a predetermined video signal. Thus, in order to obtain an NTSC signal, a plurality of color signals, for example, red, green and blue color signals, are separated from the composite signal at the pick-up tube output and are applied to a matrix circuit, an adder circuit or the like, to provide a luminance signal Y and color difference signals R-Y and B-Y of predetermined levels, which are then modulated by a modulator circuit. This leads to complexity of the television camera.

Recently, it has been proposed to provide a color television camera of the type in which a color separated image of an object to be televised is projected on a photoelectric conversion layer of an image pickup tube by the employment of striped red, green and blue or cyan, magenta and yellow color filters, and such layer is scanned by an electron beam to obtain a signal which is phase modulated with red, green and blue signal components.

The present invention has for its object to provide a system for converting such a phase modulated color video signal into an NTSC signal without demodulating the color signal components.

In accordance with an aspect of this invention, the phase modulated color video signal is amplitude modulated by a signal of a frequency twice as high as the carrier frequency of the color video signal and a vector converted color video signal is derived from the result of such amplitude modulation, for example, to conform to the NTSC color signal.

The above, and other objects, features and advantages of this invention, will be apparent in the following detailed description of illustrative embodiments which is to be read in connection with the accompanying drawings, wherein:

FIGS. 10A–10C and 11A–11C are waveform diagrams to which reference will be made in explaining this invention;

FIG. 18 is a block diagram illustrating another embodiment of this invention.

Figure 1:
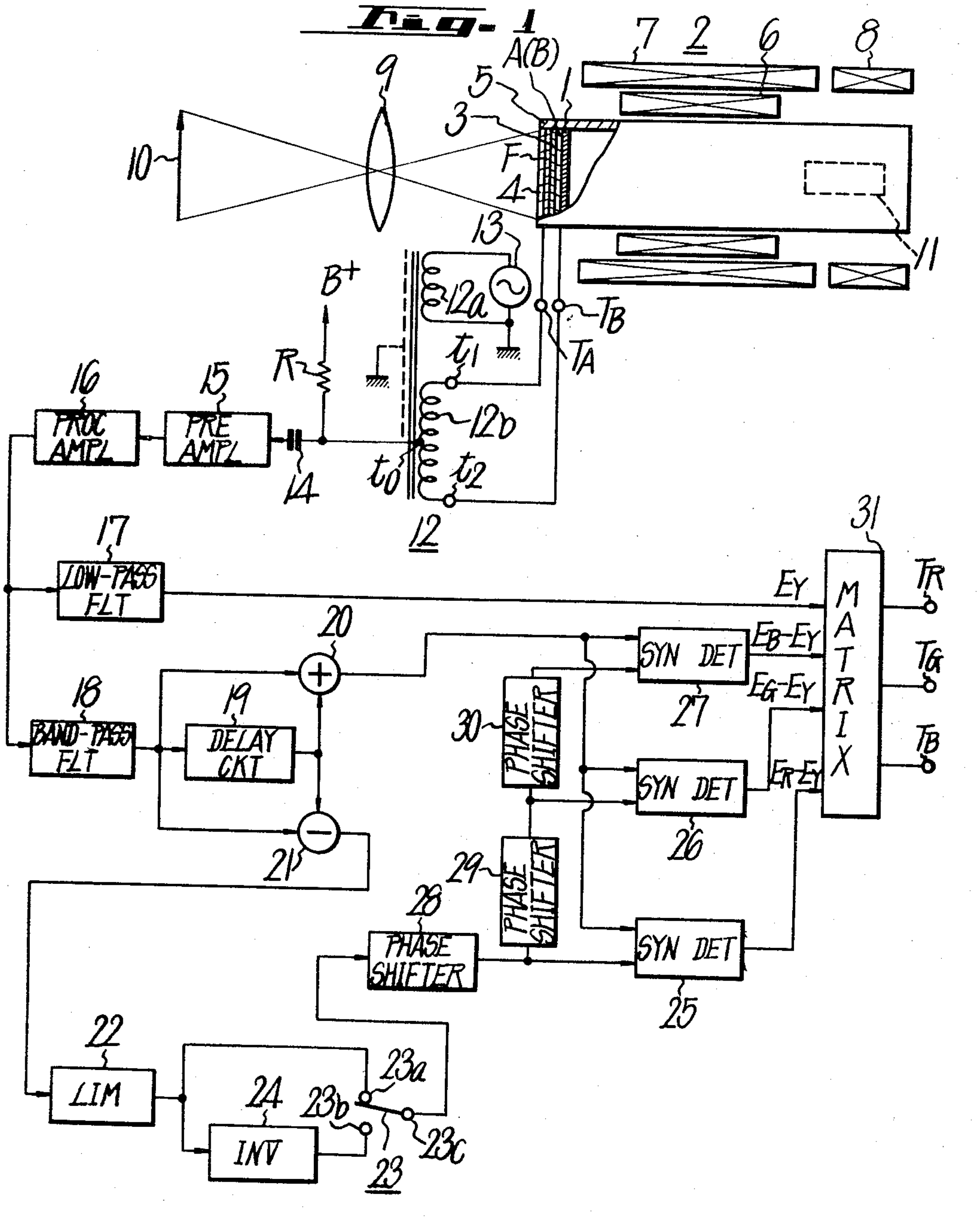
FIG. 1 is a block diagram showing one example of a color television camera to which this invention may be advantageously applied.
Figure 2:
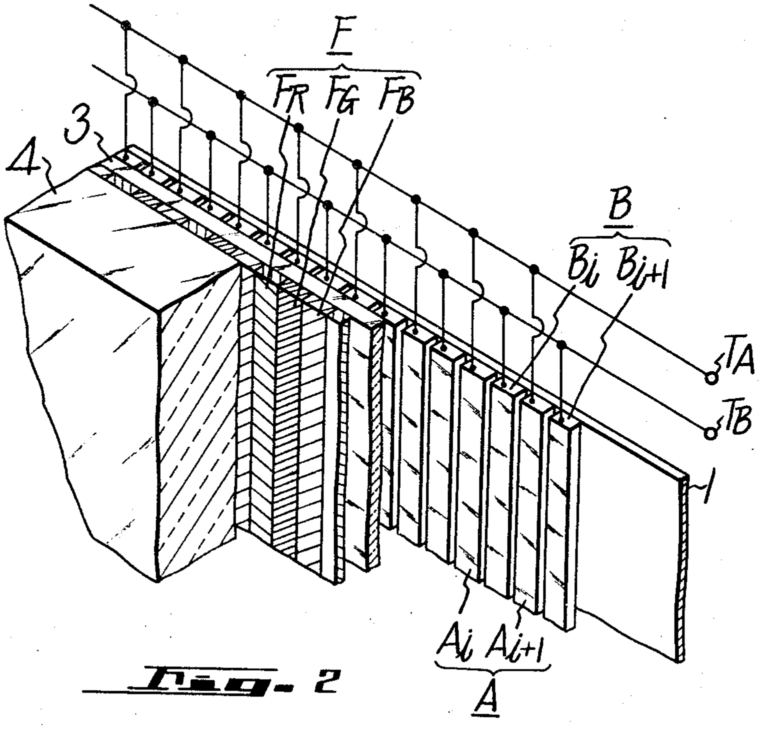
FIG. 2 is an enlarged, fragmentary perspective view, partly in section, of a principal part of an image pickup tube included in the camera of FIG. 1.

Referring to the drawings in detail, and initially to FIGS. 1 and 2, it will be seen that a color television camera to which this invention may be advantageously applied may be of the type disclosed in detail in U.S Pat. application Ser. No. 72,593, filed Sept. 16, 1970 by Yasuharu Kubota, one of the present joint inventors, and having a common assignee herewith. Such camera is shown to comprise an electrode A consisting of parallel, spaced electrode stripes $A_1$, $A_2$, ---$A_i$ -- $A_n$, and an electrode B consisting of parallel, spaced electrode stripes $B_1$, $B_2$, -- $B_i$ ---$B_n$ disposed adjacent the photoconductive layer 1 of an image pickup tube 2. The photoconductive layer 1 may be formed, for example, of materials such as antimony trisulfide, lead oxide, and the like, and the electrodes A and B are transparent conductive layers formed, for example, of tin oxide including antimony. The conductive stripes of electrodes A and B are alternately arranged, for example, in the order $A_1$, $B_1$, $A_2$, $B_2$, --- $A_i$, $B_i$, --- $A_n$, $B_n$, and the electrodes A and B are respectively connected to terminals $T_A$ and $T_B$ for connection with external circuits. Further, the electrodes A and B are disposed so that the longitudinal directions of the stripes may cross the horizontal scanning direction of an electron beam in tube 2.

The electrodes A and B are disposed on one side of a glass plate 3, on the other side of which there is disposed an optical filter F made up of red, green and blue color filter elements $F_R$, $F_G$ and $F_B$ which are stripe-like and arranged in a repeating cyclic order of $F_R$, $F_G$, $F_B$, $F_R$, $F_G$, $F_B$,... Such filter elements are disposed parallel to the length of the conductive stripes of electrodes A and B in such a manner that each triad of red, green and blue color filter elements $F_R$, $F_G$ and $F_B$ is opposite to a pair of adjacent electrode stripes $A_i$ and $B_i$. So long as the stripes of electrodes A and B and of the optical filter F are aligned with each other in their longitudinal directions, their relative lateral arrangement is not critical. The optical filter F may be fixed to the faceplate 4 which closes the front end of the tube envelope 5 so that the latter encloses the photoconductive layer 1, the electrodes A and B, the glass plate 3 and the optical filter F.

The image pickup tube 2 is further shown to have an electron gun 11 in the tube envelope 5 for directing an electron beam against layer 1, and a deflection coil 6, focusing coil 7 and alignment coil 8 extend about the tube envelope to produce respective magnetic fields for acting on the electron beam. Further, in front of the face plate 4 there is an image lens 9, by means of which the image of an object O to be televised is focused onto the photoconductive layer 1 through the faceplate 4.

Figure 3:
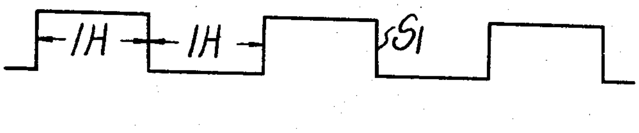
FIGS. 3 and 4A–4F are waveform diagrams, to which reference will be made in explaining the operation of the camera of FIG. 1.

Associated with the described tube 2 is a transformer 12 which consists of a primary winding 12*a* and a secondary winding 12*b* having a mid tap $t_0$ and end terminals $t_1$ and $t_2$ which are respectively connected to the terminals $T_A$ and $T_B$ of the image pickup tube 2. The primary winding 12*a* is connected to a signal source 13 which produces an alternating signal $S_1$ that is synchronized with the line scanning period of the image pickup tube 2. This alternating signal $S_1$ has a rectangular waveform, for example, as illustrated in FIG. 3, with a pulse width equal to a horizontal scanning period H of the electron beam, for instance, a pulse width of 63.5 microseconds and a frequency which is one-half of the horizontal scanning frequency, that is, 15.75/2 KHz. The mid tap $t_0$ of the secondary winding 12*b* of the transformer 12 is connected to the input of a pre-amplifier 15 through a capacitor 14 and is supplied with a DC bias voltage of 10 to 50V from a power source B+ through a resistor R.

Figure 5:
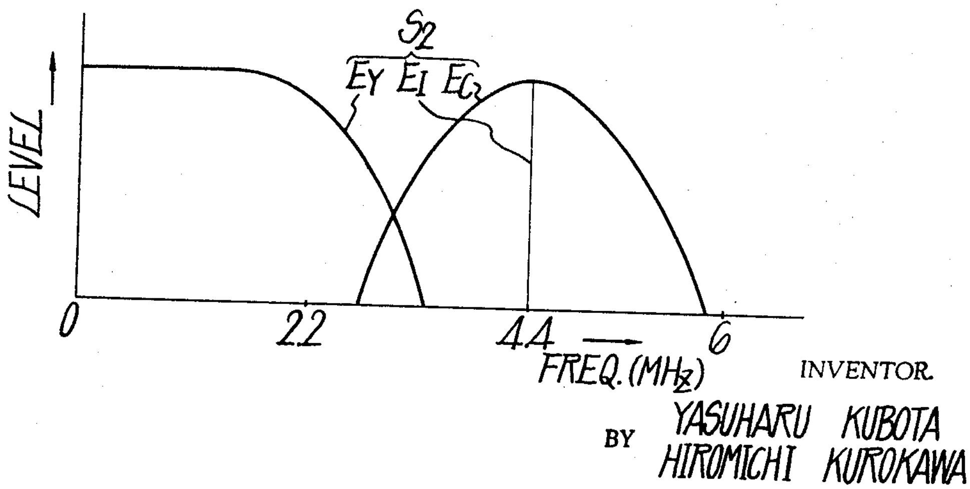
FIG. 5 is a graph showing the frequency distribution in the output from the camera of FIG. 1.
Figure 4A:
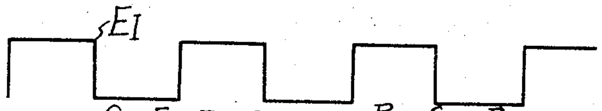
Figure 4B:
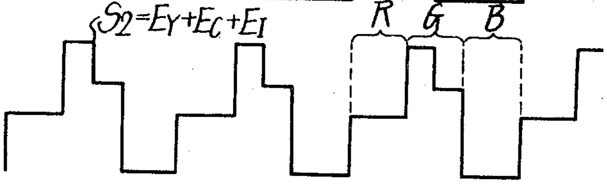

With such an arrangement, the electrodes A and B are alternately supplied with voltages that are higher and lower than the DC bias voltage for every horizontal scanning period, so that a striped potential pattern corresponding to the electrodes A and B is formed on the surface of the photoconductive layer 1. Accordingly, when the image pickup tube 2 is not exposed to light, a signal corresponding to the rectangular waveform illustrated in FIG. 4A is derived at the mid tap $t_0$ due to electron beam scanning in a scanning period Hi. When a DC bias voltage, for example, of 30V, is supplied to the mid tap $t_0$ of the secondary winding 12*b* and an alternating voltage of 0.5V is impressed between the terminals $T_A$ and $T_B$, a current flowing across the resistor R varies by 0.05 microamperes and can be used as an index signal. The frequency of this index signal $E_I$ (FIG. 4A) may be determined with reference to the width and interval of the electrodes A and B and one horizontal scanning period of the electron beam, and, for example, may be 4.48 MHz. When the image of the object O is focused on the photoconductive layer 1, signals corresponding to the light intensity of the filtered red, green and blue components are produced on the photoconductive layer 1 in overlapping relation with the index signal $E_I$ to produce a composite signal $S_2$, for example, as illustrated in FIG. 4B, in which the reference characters R, G and B respectively designate portions of the composite signal $S_2$ corresponding to the red, green and blue color components. The composite signal $S_2$ is the sum of the luminance signal $E_Y$, the chrominance signal $E_C$ and the index signal $E_I$, that is, $S_2 = E_Y + E_C + E_I$. The frequency spectrum of the composite signal $S_2$, as illustrated in FIG. 5, is determined by the width of the electrodes A and B, the width of the optical filter F and the horizontal scanning period. Therefore, the composite signal $S_2$ is, in its entirety, in a bandwidth of 6MHz and the luminance and chrominance signals $E_Y$ and $E_C$ are respectively arranged in the lower and higher bands. It is preferred to minimize overlapping of the luminance and chrominance signals $E_Y$ and $E_C$ and, if desired, for this purpose a lenticular lens or the like may be disposed in front of the image pickup tube 2 to optically lower resolution and narrow the luminance signal band.

In the next horizontal scanning period $H_{i+l}$ the voltage(alternating signal) applied to the electrodes A and B is reversed in phase, in which case an index signal $-E_I$ is produced, for example, as depicted in FIG. 4A', which is opposite in phase to the index signal $E_I$ shown in FIG. 4A. Accordingly, a composite signal $S_2'$ is derived at the input side of the preamplifier 15, as shown in FIG. 4B', that is, $S_2' = E_Y + E_C - E_I$.

Figure 4C:
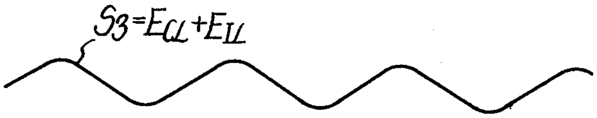
Figure 4A:
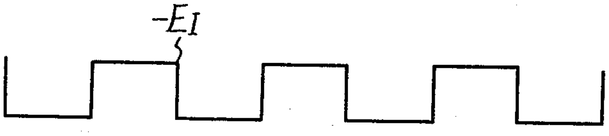
Figure 4B:
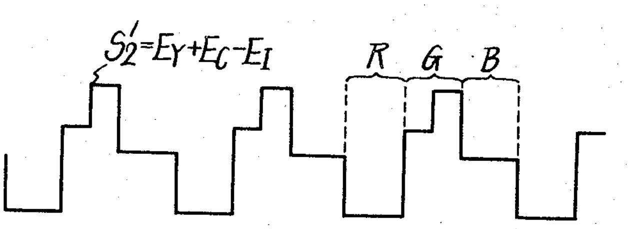
Figure 4C:

Such a composite signal $S_2$ (or $S_2'$) is first supplied to the pre-amplifier 15, to be amplified therein, and is then supplied to the process amplifier 16 for waveform shaping and/or gamma correction. Thereafter, the signal is applied to both a low-pass filter 17 and a band-pass filter 18. As a result, the luminance signal $E_Y$ and a signal $S_3 = E_{CL} + E_{IL}$, for example, as shown in FIG. 4C (or a signal $S_3' = E_{CL} - E_{IL}$ as depicted in FIG. 4C') are separately derived from the lowpass filter 17 and the bandpass filter 18, respectively. In the foregoing equations for $S_3$ and $S'_3$, $E_{CL}$ and $E_{IL}$ are low frequency components or fundamental components of the chrominance signal $E_C$ and the index signal $E_I$ respectively.

Since the repetitive frequencies of the index signal $E_I$ and the chrominance signal $E_C$ are equal to each other, the separation of these signals is achieved in the following manner without using a filter.

Figure 4D:
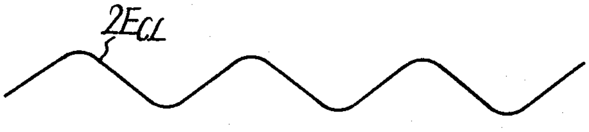

Reference nuemral 19 indicates a delay circuit such, for example, as an ultrasonic delay line, by means of which the signal $S_3 = E_{CL} + E_{IL}$ (or $S_3' = E_{CL} - E_{IL}$) derived from the bandpass filter 18 is delayed by one horizontal scanning period 1H. The signal $S_3 = E_{CL} + E_{IL}$ (or $S_3' = E_{CL} - E_{IL}$) in a certain horizontal scanning period $H_i$ and the signal $S_3' = E_{CL} - E_{IL}$ (or $S_3 = E_{CL} + E_{IL}$) in the subsequent horizontal scanning period $H_{i+l}$, which are derived from the delay circuit 19 and the bandpass filter 18 are supplied to an adder circuit 20 to be added together and to provide as an output, a chrominance signal $2E_{CL}$ such as is depicted in FIG. 4D. When the delay circuit 19 is one horizontal scanning period, the content of chrominance signals in adjacent horizontal scanning periods are so similar that they can be regarded as substantially the same. It is also possible to delay the signal from the bandpass filter 18 by three or five horizontal scanning periods due to the similarity of the chrominance signal contents in periods that are spaced even to that extent.

Figure 4E:
Figure 4F:
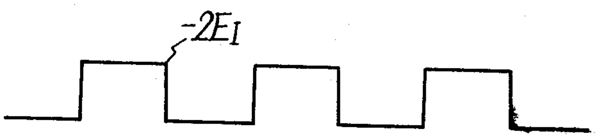

These signals $S_3 = E_{CL} + E_{IL}$ (or $S_3' = E_{CL} - E_{IL}$) and $S_3' = E_{CL} - E_{IL}$ (or $S_3 = E_{CL} + E_{IL}$) in the horizontal scanning periods $H_i$ and $H_{i+l}$ are applied to a subtraction circuit 21 to achieve a subtraction $(E_{CL} - E_{IL}) - (E_{CL} + E_{IL})$ or $(E_{CL} + E_{IL}) - (E_{CL} - E_{IL})$, and to derive therefrom an index signal $-2E'_{IL}$, as depicted in FIG. 4E, (or $2E'_{IL}$, not shown). The resulting index signal $-2E'_{IL}$ (or $2E_{IL}$) is fed to a limiter circuit 22 to render its amplitude uniform and thereby form an index signal $-2E_1$ (or $2E_I$), as depicted in FIG. 4F.

The index signal $-2E_I$ (or $2E_I$) thus obtained is reversed in phase at every horizontal scanning period, so that the signal $-2E_I$ is corrected in phase in the following manner. Reference numeral 23 identifies a change-over switch which is preferably an electronic switch in practice. Such switch is shown to have fixed contacts 23*a* and 23*b* and a movable contact 23*c*. The output of the limiter 22 is directly connected to one fixed contact 23*a* of the change-over switch 23 and is connected to the other fixed contact 23*b* through an inverter 24. The change-over switch 23 is arranged so that its movable contact 23*c* makes contact with the fixed contacts 23*a* and 23*b* alternately in successive horizontal scanning periods in synchronism with the alternating signal $S_I$ impressed on the primary winding 12*a* of the transformer 12 to thereby derive the index signal $2E_I$ from the movable contact 23*c* at all times.

The chrominance signal $E_{CL}$ derived from the adder circuit 20 is supplied to each of three synchronous detectors 25, 26 and 27. The index signal $E_{IL}$ is supplied to the synchronous detector 25 through a phase shifter 28 which adjusts the phase of the index signal to the axis of the red signal in order to produce a color difference signal $E_R$–$E_Y$ at the output of the detector 25. In a similar manner the output signal from the phase shifter 28 is supplied to the synchronous detector 26 through a phase shifter 29 to produce a color difference signal $E_G$–$E_Y$ at the output of the detector 26 and the output signal from the phase shifter 29 is supplied to the synchronous detector 27 through the phase shifter 30 to produce a color difference signal $E_B$–$E_Y$ at the output of the detector 27. The phase shifters 29 and 30 each change the phase of the input signals by 120°. These color difference signals $E_R$–$E_Y$, $E_G$–$E_Y$ and $E_B$– $E_Y$ and the luminance signal $E_Y$ are applied to a matrix circuit 31 which provides color signals $E_R$, $E_G$ and $E_B$ at its terminals $T_R$, $T_G$ and $T_B$, respectively. The color signals thus obtained have to be suitably processed to produce color television signals conforming to the NTSC system and other various systems.

However, in accordance with this invention, the described camera is modified, particularly with respect to its filter F, and the NTSC signals are obtained directly from the output of image pickup tube 2, that is, without demodulating the color signals $E_R$, $E_G$ and $E_B$ obtained at the respective terminals of the matrix 31 on FIG. 1.

Figure 6:
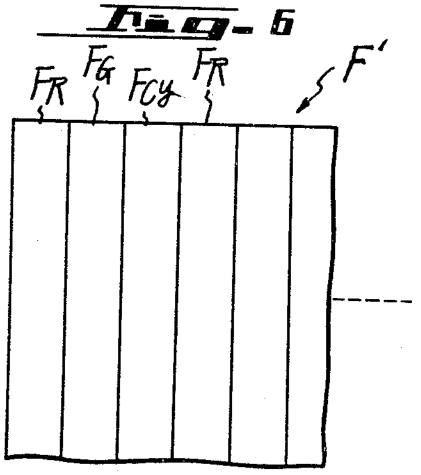
FIG. 6 is a fragmentary plan view of a color filter for use in the camera according to this invention.

As shown on FIG. 6, the filter F of FIG. 2 is preferably replaced by a filter F' in which the blue filter stripe $F_B$ of each triad is replaced by a cyan filter stripe or element $F_{CY}$. Thus, the filter F' is made up of repetitively arranged triads of red, green and cyan filter elements or stripes $F_R$, $F_G$ and $F_{CY}$.

Figure 7:
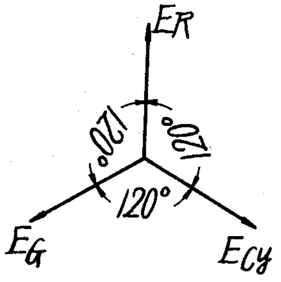
FIGS. 7 and 8 are vector diagrams of a color signal produced when employing the filter shown in FIG. 6.
Figure 8:
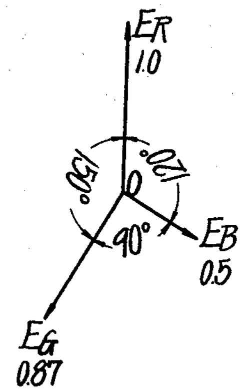

With such a filter F', a video signal as shown in FIG. 7 is obtained from pickup tube 2, and in which red, green and cyan color signals $E_R$, $E_G$ and $E_{CY}$ are spaced apart at angular phase intervals of 120°. If it is assumed that the cyan color signal $E_{CY}$=½($E_G$+$E_B$), the vector addition of the green color signal ½ $E_G$ contained in the cyan color signal $E_{CY}$ to the original green color signal $E_G$ results in the green color signal having an amplitude of 0.87 $E_G$ and its phase is spaced 150° from the red color signal, as shown in FIG. 8. Further, as shown the blue color signal contained in the cyan color signal $E_{CY}$ has an amplitude of ½ $E_B$ and is spaced 120° from the red signal. As a result, the following chrominance signal is produced.

$$E_C=E_R\sin\omega t+0.87E_G\sin(\omega t-150°)+0.5E_B\sin(\omega t-240°) \quad 1.$$

In the luminance signal $E_Y$, the cyan color component $E_{CY}=½(E_G+E_B)$ is obtained from light passing through the cyan color filter elements $F_{CY}$, so that the following luminance signal is obtained (the luminance signal is not a vector in this case).

$$E_Y=⅓[E_R+E_G+½(E_G+E_B)]=0.33E_R+0.5E_G+0.17E_B \quad 2.$$

It will be seen that the ratio of its respective color components in the above luminance signal is close to that of the luminance signal $Y_{NTSC} = 0.30E_R + 0.59E_G + 0.11E_B$ in the NTSC system which is determined by the visibility characteristic.

Accordingly, the composite color video signal obtained with the filter F' of FIG. 6 can be converted into an NTSC signal by slight correction in accordance with this invention.

Figure 9:
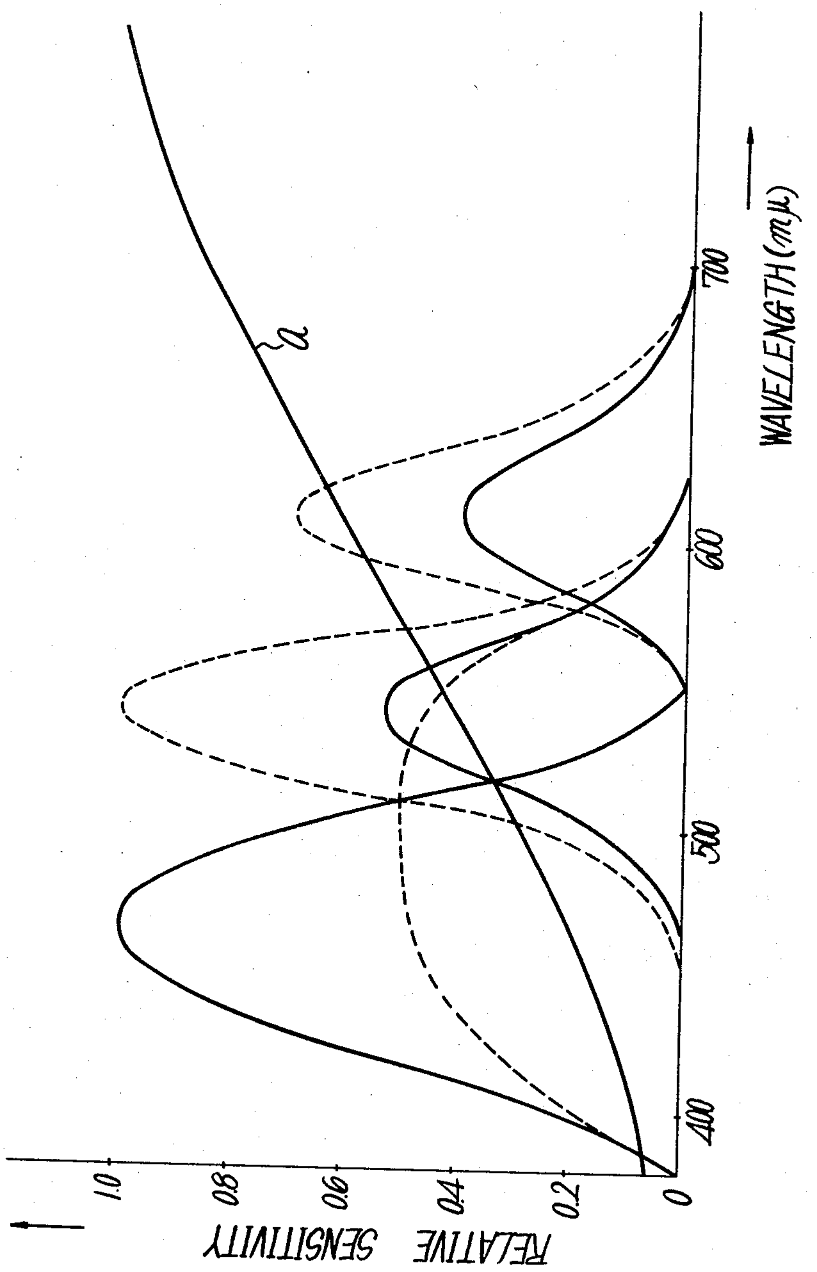
FIG. 9 is a graphic representation of the spectral characteristics of the filters shown on FIGS. 2 and 6, respectively.
Figure 12:
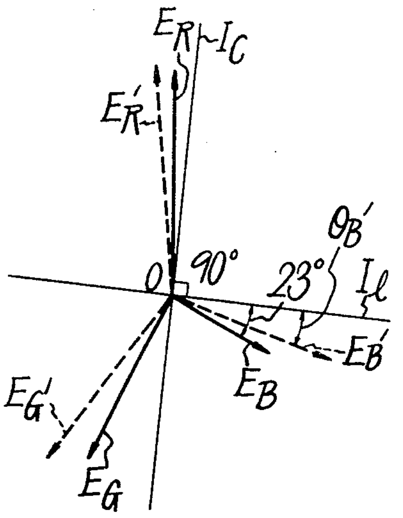
FIGS. 12, 13 and 14 are vector diagrams to which reference will be made in explaining this invention.

Further, in a television studio or the like, illumination having a color temperature of 3,000°K is often employed. In order to maintain white balance under such illumination, the filter is required to have a spectral characteristic similar to that shown in broken lines on FIG. 9. In FIG. 9, the curves in full lines represent the spectral characteristics when employing the color filter of FIG. 2 consisting of red, green and blue color filter elements and the curves in broken lines represent the spectral characteristics when using the filter F' (FIG. 6) consisting of red, green and cyan color filter elements. Further, the curve *a* represents the energy spectrum for illumination having a color temperature of 3,000°K. It will be apparent from FIG. 6, that the area under the curves representing the filter employing the red, green and cyan color filter elements is twice as large as that with the filter consisting of the red, green and blue color filter elements, from which it follows that the brightness obtainable with the former is substantiall twice that with the latter. Therefore, the filter F' consisting of the red, green and cyan color filter elements is also advantageous in obtaining increased brightness.

In the foregoing, consideration has not been given to any decrease in the signal due to slits or spaces provided between the electrode stripes of electrodes A and B for insulating the electrodes A and B from each other. However, such slits may be made as narrow as, for example, about 1 to 5 microns in which case substantially no decrease is caused in the signal.

In accordance with the present invention such a phase-modulated signal, as represented by FIG. 8, is amplitude-modulated with a signal having a frequency twice as high as the carrier frequency of the phase-modulated signal so as to adjust the phase and/or amplitude to that of a required color signal.

Figure 10:
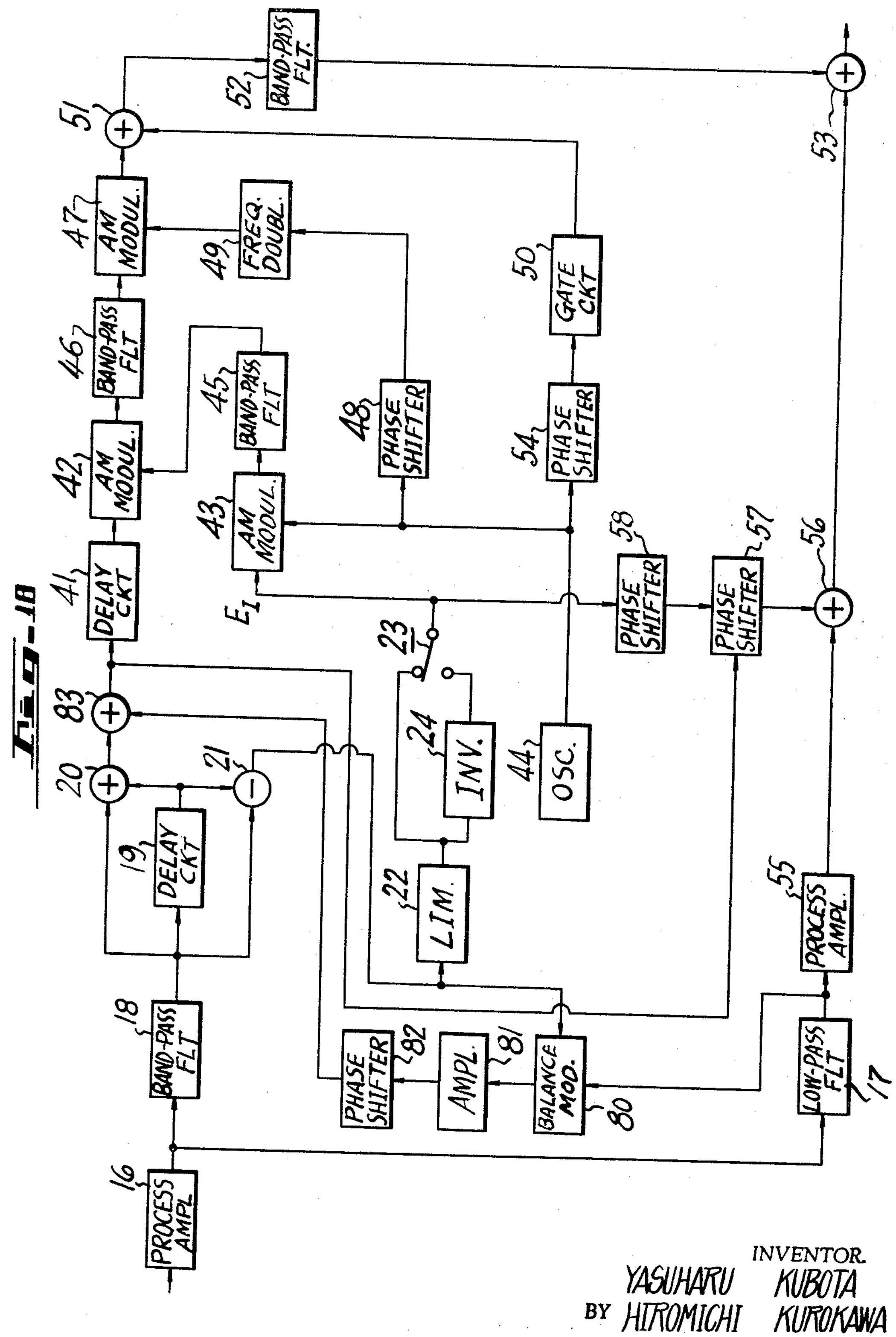

When a blue color signal (a carrier color signal) $E_B$ is amplitude-modulated with a modulating signal S having a frequency twice as high as the carrier frequency of the blue color signal $E_B$ and which is displaced a predetermined angle in phase from the signal $E_B$, in such a manner that the gain of the signal $E_B$ may be 1.5 times its original gain at the positive peak of the signal S and equal to the original gain at the negative peak thereof, as shown in FIGS. 10A and 10B, the resulting blue color signal $E_B$ has a level 1.5 times that of the original signal (FIG. 10C).

When, in the case of the red color signal (a carrier color signal) $E_R$, the modulating signal S has a negative peak value (the amplification degree being 1) at each of the positive and negative peak values of the red color signal $E_R$ and the amplitude of the signal S remains unchanged (FIGS. 11A and 11B), then the resulting red color signal is unchanged (FIG. 11C).

Accordingly, when modulating the carrier color signal having the vector arrangement shown on FIG. 8 with the modulating signals S, if the reference phase *Il* of the modulating signal S, at which the amplitude of the carrier color signal is modulated 1.5 times, is selected to be, for example, 23 degrees ahead of the phase of the blue color signal $E_B$, a phase $I_c$ advanced 90 degrees relative to the phase *Il* is opposite to that of the carrier color signal and the carrier color signal is modulated one time by the modulating signal S, because the frequency of the modulating signal is twice that of the carrier color signal.

As a result of the foregoing, the blue color signal $E_B$, which is at the smallest angle with respect to the modulation axis $Il$, changes to $E'_B$ and is amplified to the greatest extent, the green color signal $E_G$ is amplified less than the blue color signal $E_B$ and the red color signal $E_R$ is hardly amplified at all but its phase is advanced slightly.

The level and phase of the modulated signal are calculated in the following manner. For example, in the case of the blue color signal $E_B$ which makes an angle of 23 degrees with the axis $Il$, the $Il$ axis component of the blue color signal $E_B$ is $E_B \cos(23°)$ and the $I_c$ axis component thereof is $E_B \sin(23°)$. However, when the blue color signal is modulated, it is amplified 1.5 times on the axis $Il$ but remains unchanged on the axis $I_c$ and the $Il$ axis and $I_c$ axis components of the modulated blue color signal $E'_B$ are $1.5\ E_B \cos(23°)$ and $E_B \sin(23°)$, respectively. Consequently, the level $E'_B$ of the modulated blue color signal and its angle $\theta'_B$ to the axis $I_c$ are as follows:

$$E'_B = [(1.5E_B\cos(23°))^2 + (E_B\sin(23°))^2]^{one\text{-}half} = 0.717$$

$$\theta'B = \arctan\ [E_B\sin(23°)/1.5E_B\cos(23°)] = 16°$$

Figure 13:
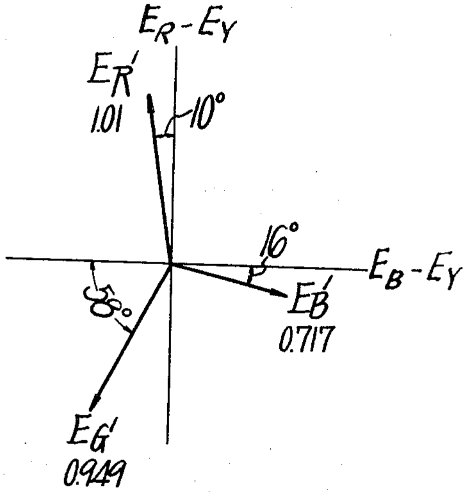

Therefore, the color signal $E_C$ given by equation (1) above becomes the signal Ech′ depicted in FIG. 13.

$$Ech' = 1.01\ E'_R\sin(\omega t + 10°) + 0.949\ E'_G\ \sin(\omega t + 148°) + 0.717\ E'_B\ \sin(\omega t + 254°)$$

Figure 14:
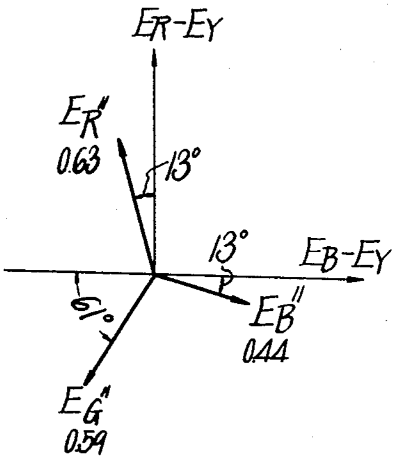

The color signal Ech′ thus obtained is multiplied (1/1.61) times by, for example, an amplifier and its phase is advanced through 3 degrees, to provide an NTSC signal Ech″, such as is shown in FIG. 14, and which is given by the following equation.

$$Ech'' = 0.63\ E''_R\ \sin(\omega t+13°)+0.59\ E''_G\ \sin(\omega t+151°)+0.44\ E''_B\ \sin\ (\omega t+257°)$$

3.

Figure 15:
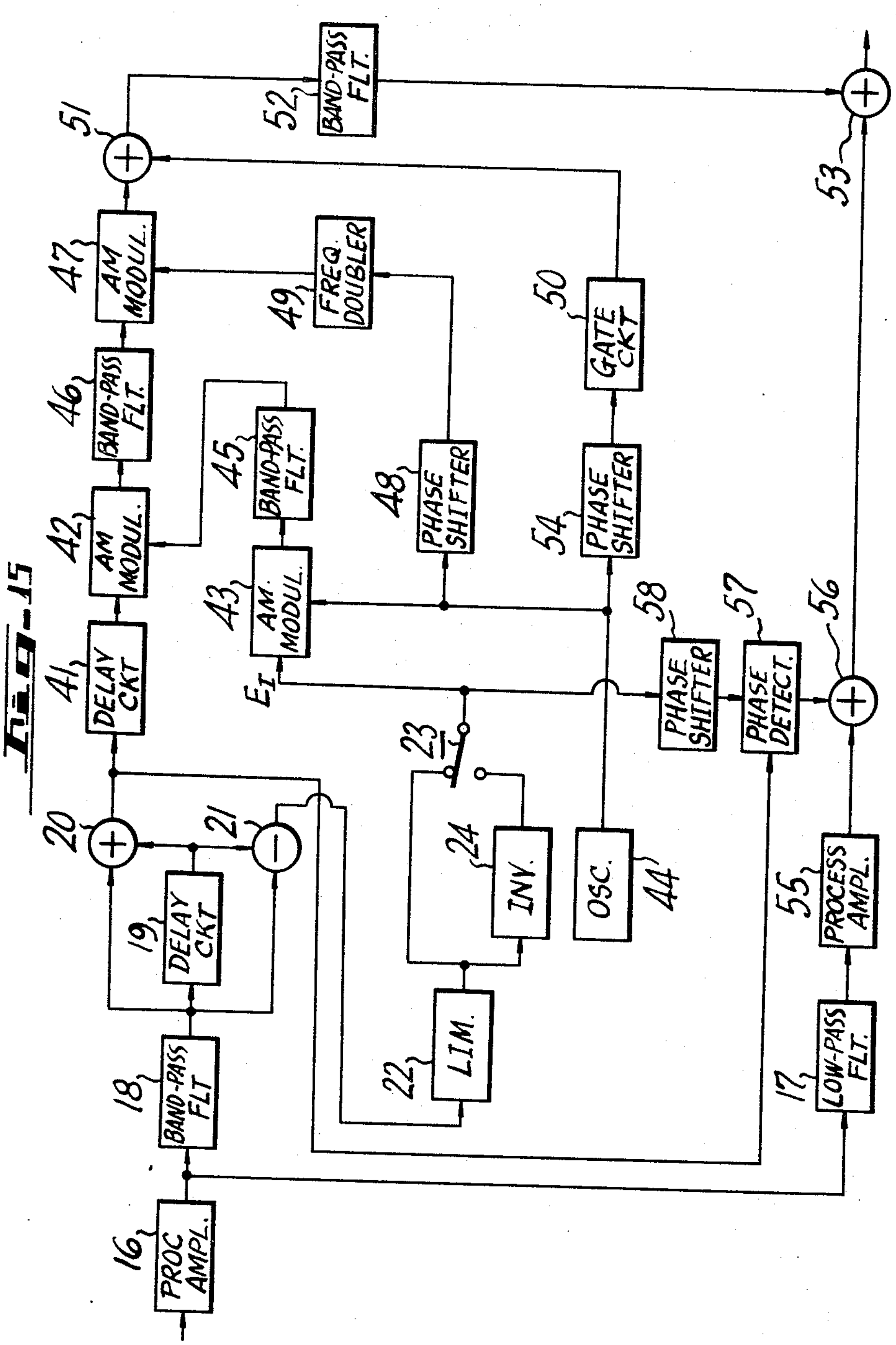
FIG. 15 is a block diagram showing a circuit arrangement according to this invention by which the color camera output signals may be directly converted into NTSC signals.

FIG. 15 illustrates, in block form, one example of a circuit arrangement according to this invention in which the signals derived from the above described color camera are directly converted into NTSC signals. In FIG. 15, components similar to those in FIG. 1 are identified by the same reference numerals and a detailed description thereof will not be repeated. As shown, the chrominance signal $E_{CL}$ derived from adder circuit 20 is applied to an AM modulator 42 through a delay circuit 41 by means of which the chrominance signal is delayed so as to be in phase with the index signal.

The index signal $E_I$ derived from change-over switch 23 is shown to be supplied to an AM modulator 43 in which it is modulated by a carrier signal $f_0$ (of 3.58 MHz) fed to the modulator 43 from a carrier oscillator 44, such as, for example, a crystal oscillator which generates a stable signal, thereby to provide a signal of 7.98 MHz as the output from modulator 43, which signal is the sum of the index signal $E_I$ of 4.4 MHz and the carrier signal $f_0$. Such output from the modulator 43 is supplied, if necessary, through a bandpass filter 45, to the modulator 42 to modulate the chrominance signal. The output from the modulator 42 is applied to a bandpass filter 46 which permits the passage therethrough of 3.58 MHz ± 750 KHz to obtain a chrominance signal having the carrier of 3.58 MHz. Accordingly, the carrier frequency of the chrominance signal $E_C$ from the adder circuit 20 is converted from 4.4 MHz to 3.58 MHz and, at the same time, stabilized by the oscillator 44. The chrominance signal thus obtained is applied to an AM modulator 47 by which vector conversion or correction is effected.

The AM modulator 47 is supplied with a carrier signal which is twice as high as the carrier frequency of the chrominance signal and which is produced by applying the signal from the oscillator 44 through a phase shifter 48 to a frequency doubler circuit 49, and the modulator 47 corrects the vector of the chrominance signal as above described. The corrected chrominance signal from the modulator 47 is fed to an adder circuit 51 in which it is added to a burst signal derived from a gate circuit 50 provided with a phase shifter circuit 54 for the burst signal. The output from the adder circuit 51 is then applied to a bandpass filter 52 to supply only the chrominance signal component of such output to an adder circuit 53.

The luminance signal derived from the low-pass filter 17 is applied to a process amplifier 55 for gamma correction, aperture correction or the like, and thence to an adder circuit 56, in which it is added to a correcting signal from a phase detector 57 to convert its ratio into that of the NTSC signal. That is, the ratios of the luminance signal $E_Y$ contained in the output from the camera according to the present invention is $E_Y=0.33E_R+0.5E_G+0.17E_B$, as given by equation (2), whereas the ratio of the luminance signal $Y_{NTSC}$ of the NTSC signal is $Y_{NTSC}=0.30E_R+0.59E_G+0.11E_B$, as is well-known. Accordingly, a correcting signal $Y_W$ necessary for correction of the luminance signal $E_Y$ is as follows:

$$Y_W=Y_{NTSC}-E_Y=-0.03E_R+0.09E_G-0.06E_B\cong-\lambda\ E_R+3E_G-2E_B.$$

Figure 16:
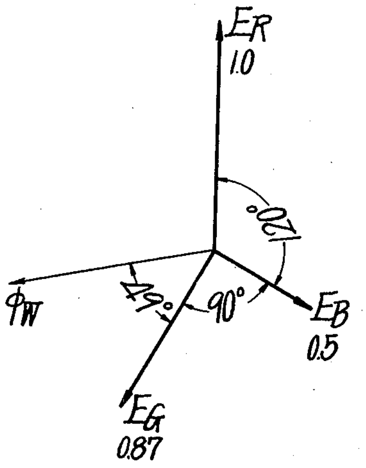
FIG. 16 is a vector diagram for explaining the operation of the circuit arrangement of FIG. 15.

The correcting signal $Y_W$ can be obtained by phase detection of the chrominance signal in the camera output with an axis $\phi_W$ displaced 49 degrees apart from the green color signal $E_G$, as shown in FIG. 16, because the resulting detected output becomes such that $D(W-Y)=\cos(101°)E_R+0.87\cos(45°)E_G+0.5\cos(139°)E_B \approx K(-E_R+3E_G-2E_B)$.

This phase detection is achieved in the phase detector circuit 57, which is supplied with the chrominance signal in the camera output signal from the adder circuit 20 and also supplied with an index signal $S_I$ from the change-over switch 23 through a phase shifter 58. The phase detected output is fed to the adder circuit 56 to add the correcting signal $Y_W$ to the camera output $E_Y$ fed from the process amplifier 55 to provide a luminance signal approximating the NTSC signal. Finally, the luminance signal from adder circuit 56 is added, in the adder circuit 53, to the chrominance signal fed from the bandpass filter 52 to provide an NTSC signal.

In the foregoing example, the index signal has been described as having a frequency of 4.4 MHz, as is the case with the carrier of the chrominance signal of the NTSC system. However, the index signal derived from the camera is usually unstable in frequency because the rate of horizontal electron beam scanning of the photoconductive layer of the image pickup tube is not uniform. Thus, even if the index signal is selected to be of 3.58 MHz, as above mentioned, it cannot be used as a subcarrier of the NTSC signal. Therefore, as above described, if the index signal of 3.58 MHz is selected, it is amplitude modulated with the stable output of the subcarrier oscillator 44 to provide a signal of 7.16 MHz, with which the chrominance signal from the camera is amplitude modulated to correct the carrier frequency of the chrominance signal with the index signal and thereby provide a chrominance signal having a stable subcarrier of 3.58 MHz.

Figure 17:
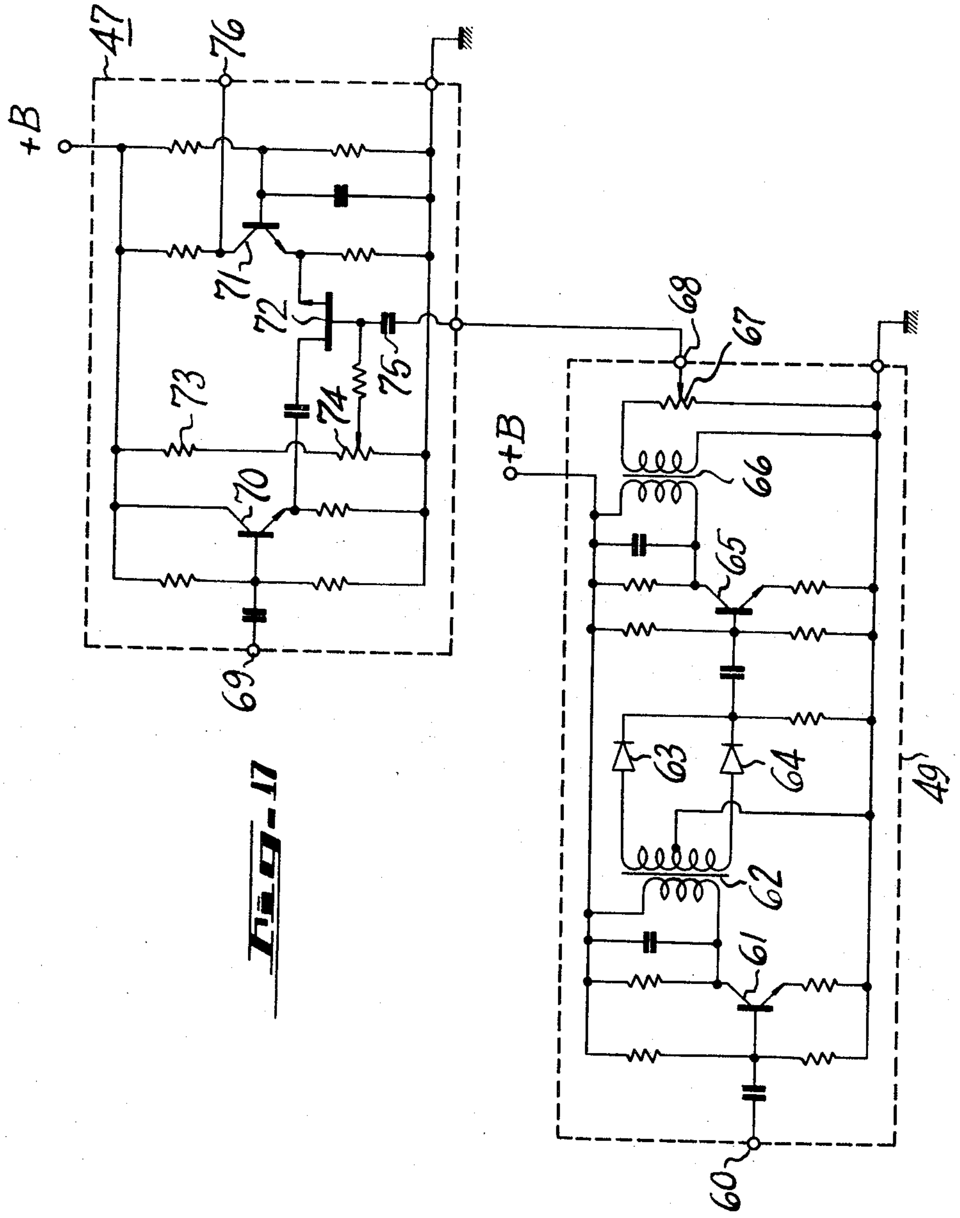
FIG. 17 is a wiring diagram of an AM modulator and frequency doubler included in the circuit arrangement of FIG. 15.

Referring now to FIG. 17, it will be seen that the frequency doubler 49 may have the carrier signal from phase shifter 48 fed to an input terminal 60 to be amplified by a transistor 61 and then supplied to a primary circuit of a transformer 62 to be rendered into a ripple current having a frequency component twice that of the carrier signal by diodes 63 and 64 connected to a secondary winding of the transformer 62. This ripple current is amplified by a transistor 65 and only a signal of a frequency twice that of the carrier signal is picked up with a transformer 66 connected to the collector circuit of transistor 65 and constituting a tank circuit tuned to the frequency twice that of the carrier signal. The signal thus obtained is applied to an output terminal 68 through a potentiometer 67.

Further, as shown on FIG. 17, the AM modulator 47 is made up of an amplifier circuit consisting of a transistor 70 for amplifying a chrominance signal input applied to an input terminal 69 from bandpass filter 46. A transistor 71 has its base grounded and a variable impedance circuit formed by a field effect transistor 72 connected between the output of the transistor 70 and the input of transistor 71. A resistor 73 and a potentiometer 74 are connected in series between power sources, and a gate bias voltage is supplied to the field effect transistor 72 from the potentiometer 74. The gate of the field effect transistor 72 is supplied with the signal of the frequency twice the carrier signal through a capacitor 75 from the output terminal 68 of the frequency doubler 49. In response to such signal supplied to the gate of transistor 72, the impedance of the field effect transistor 72 is varied and the chrominance signal is amplitude modulated to derive a vector converted or corrected chrominance signal at an output terminal 76 connected to adder 51.

The potentiometer 67 is provided to adjust the intensity of the signal fed to the gate of the field effect transistor 72 so as to multiply the blue color signal 1.5 times with the axis $Il$ and the potentiometer 74 is provided to adjust the bias so as to perform one-time modulation with the axis $I_c$.

FIG. 18 shows another embodiment of this invention which is identical with the embodiment of FIG. 15, except that a white balance correcting circuit is provided. Components in FIG. 18 similar to those in FIG. 15 are identified by the same reference numerals and a detailed description thereof will not be repeated.

In the embodiment of FIG. 18, the luminance signal from the lowpass filter 17 is supplied to a balanced modulator 80 and is therein modulated with the index signal $E_I$ derived from the subtracting circuit 21. The modulated output from modulator 80 is applied, if necessary, through an amplifier 81 and a phase shifter 82, to an adder circuit 83 to be added to the chrominance signal $E_{CL}$ derived at the output of the adder circuit 20.

With such an arrangement, when the white balance of the luminance signal is lost by a change in the color temperature of an object to be televised, or for some other reason, white balance can be restored by adding the chrominance signal $E_{CL}$ with the output of the balanced modulator 80 after amplifying it and adjusting its phase with the phase shifter 82 in a manner to increase the insufficient color component.

In the above described embodiments, the color filter F has been incorporated in the image pickup tube but it is also possible to provide the color filter outside of the pickup tube, in which case the color separated images may be formed on the photoconductive layer 1 by the use of a relay lens, lenticular lens or other optical means.

Further, the structure of electrodes A and B may also be variously modified, for example, as proposed in the aforesaid copending application Ser. No. 72,593 filed Sept. 16, 1970.

It is further to be noted that the present invention is not limited specifically to the camera described above but may be applied to any camera providing a signal in which color components of the color video signal are modulated with different phases.

It will be apparent that many modifications and variations may be effected in the described illustrative embodiments without departing from the scope of the novel concepts of this invention.

What is claimed is:

1. A color television signal reproducing system comprising an amplitude modulator, means for supplying to said amplitude modulator a phase modulated color video signal of a predetermined carrier frequency, means for producing a signal of a frequency twice as high as said carrier frequency, means for supplying said signal of a frequency twice as high as said carrier frequency to said amplitude modulator to modulate said color video signal, and means for deriving a vector converted color video signal from said modulator.

2. A color television signal reproducing system as in claim 1, in which said means for applying said phase modulated color video signal includes an image pickup tube having a photoconductive layer, means to form striped red, green and cyan color separated images on said photoconductive layer, and means for scanning said photoconductive layer by an electron beam in a direction perpendicular to said color separated images.

3. A color television signal reproducing system comprising an amplitude modulator, means for supplying to said amplitude modulator a phase modulated color video signal of a predetermined carrier frequency, means for producing a signal of a frequency twice as high as said carrier frequency, means for supplying said signal of a frequency twice as high as said carrier frequency to said amplitude modulator to modulate said color video signal, and means for deriving a vector converted color video signal from said modulator, wherein said means for applying said phase modulated color video signal includes an image pickup tube having a photoconductive layer, means to form striped red, green and cyan color separated images on said photoconductive layer, and means for scanning said photoconductive layer by an electron beam in a direction perpendicular to said color separated images and further including means for deriving an index signal from said image pickup tube, another amplitude modulator for modulating said index signal with a stable signal, means for deriving from said other amplitude modulator a signal of a frequency which is the sum of the frequencies of said index signal and said stable signal, and still another amplitude modulator for modulating the phase modulated color video signal from the image pickup tube with said signal of the sum frequency and thereby converting the carrier frequency of the phase modulated color video signal into the frequency of said stable signal.

4. A color television signal reproducing system comprising an amplitude modulator, means for supplying to said amplitude modulator a phase modulated color video signal of a predetermined carrier frequency, means for producing a signal of a frequency twice as high as said carrier frequency, means for supplying said signal of a frequency twice as high as said carrier frequency to said amplitude modulator to modulate said color video signal, and means for deriving a vector converted color video signal from said modulator, wherein said means for supplying said phase modulated color video signal includes a color television camera having an image pickup tube with a photo-conductive layer, a plurality of sets of electrodes provided on said photoconductive layer, means for supplying an alternating signal between said electrodes in synchronism with the scanning period, means for projecting red, green and cyan color separated images on the photoconductive layer and output means at which a composite signal composed of a chrominance signal and an index signal superimposed on each other is obtained.

* * * * *